United States Patent
Bocaletti

(10) Patent No.: US 10,438,154 B2
(45) Date of Patent: Oct. 8, 2019

(54) GUARANTEED PROCESSING FOR PERFORMING A WORK ITEM QUEUING OPERATION USING GENERATIONAL QUEUES

(71) Applicant: Dell Products L.P., Round Rock, TX (US)

(72) Inventor: Luis E. Bocaletti, Chicago, IL (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 15/603,683

(22) Filed: May 24, 2017

(65) Prior Publication Data
US 2018/0341900 A1    Nov. 29, 2018

(51) Int. Cl.
*G06F 9/455* (2018.01)
*G06Q 10/06* (2012.01)
*G06F 9/48* (2006.01)

(52) U.S. Cl.
CPC ..... *G06Q 10/06316* (2013.01); *G06F 9/4806* (2013.01)

(58) Field of Classification Search
None
See application file for complete search history.

(56) References Cited

U.S. PATENT DOCUMENTS

| | | | | |
|---|---|---|---|---|
| 5,687,336 A | * | 11/1997 | Shen | G06F 9/34 712/202 |
| 8,054,776 B2 | * | 11/2011 | Molisch | H04W 52/241 370/319 |
| 2011/0258638 A1 | * | 10/2011 | Davies | G06F 9/546 719/314 |

* cited by examiner

*Primary Examiner* — Wissam Rashid
(74) *Attorney, Agent, or Firm* — Terrile, Cannatti & Chambers; Stephen A. Terrile

(57) ABSTRACT

A system, method, and computer-readable medium are disclosed for performing a work item queuing operation. The work item queuing operation includes sending a work item from a producer to a processor; adding the work item to a generational queue upon sending the work item from the producer to the processor via a push operation; and, resending the work item from the producer to the processor via a pop operation when the work item is not processed by the processor, the work item queuing operation centralizing detection and reprocessing of items that were not processed due to work item loss.

9 Claims, 4 Drawing Sheets

GUARANTEED PROCESSING FOR PERFORMING A WORK ITEM QUEUING OPERATION USING GENERATIONAL QUEUES

BACKGROUND OF THE INVENTION

Field of the Invention

The present invention relates to information handling systems. More specifically, embodiments of the invention relate to processing information using generational queues.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In messaging systems with potential work item loss, a challenge is presented when a system has to guarantee that all work items are actually processed.

SUMMARY OF THE INVENTION

A system, method, and computer-readable medium are disclosed for performing a generational queue operation. In certain embodiments, the generational queue operation centralizes detection and reprocessing of items that were not processed due to work item loss by using a work item specific data structure to track and select a next item to process.

In certain embodiments, the generational queue operation uses a generational queue. Items that need processing are added to the generational queue. In certain embodiments, in addition to the actual item, the queue maintains a time stamp and generation indication. In certain embodiments, the generation indication includes a counter which indicates a generation for the item. In certain embodiments, the generation indication indicates how many times the item has been added to the queue. As items need to be processed, the queue returns the item most eligible to be processed, taking into consideration time in the queue, position and generation. At the same time, the item is removed from the top of the queue and re added to the end with a new time stamp and an increased generation. As items are processed the queue removes them.

Such a generational queue operation advantageously maintains and tracks item processing progress in a centralized location. Additionally, such a generational queue operation need not rely upon a specialized work item mechanism to ensure that each processing work item is delivered to the appropriate location. Additionally, such a generational queue operation provides an adaptive mechanism for reducing reprocessing of work items.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
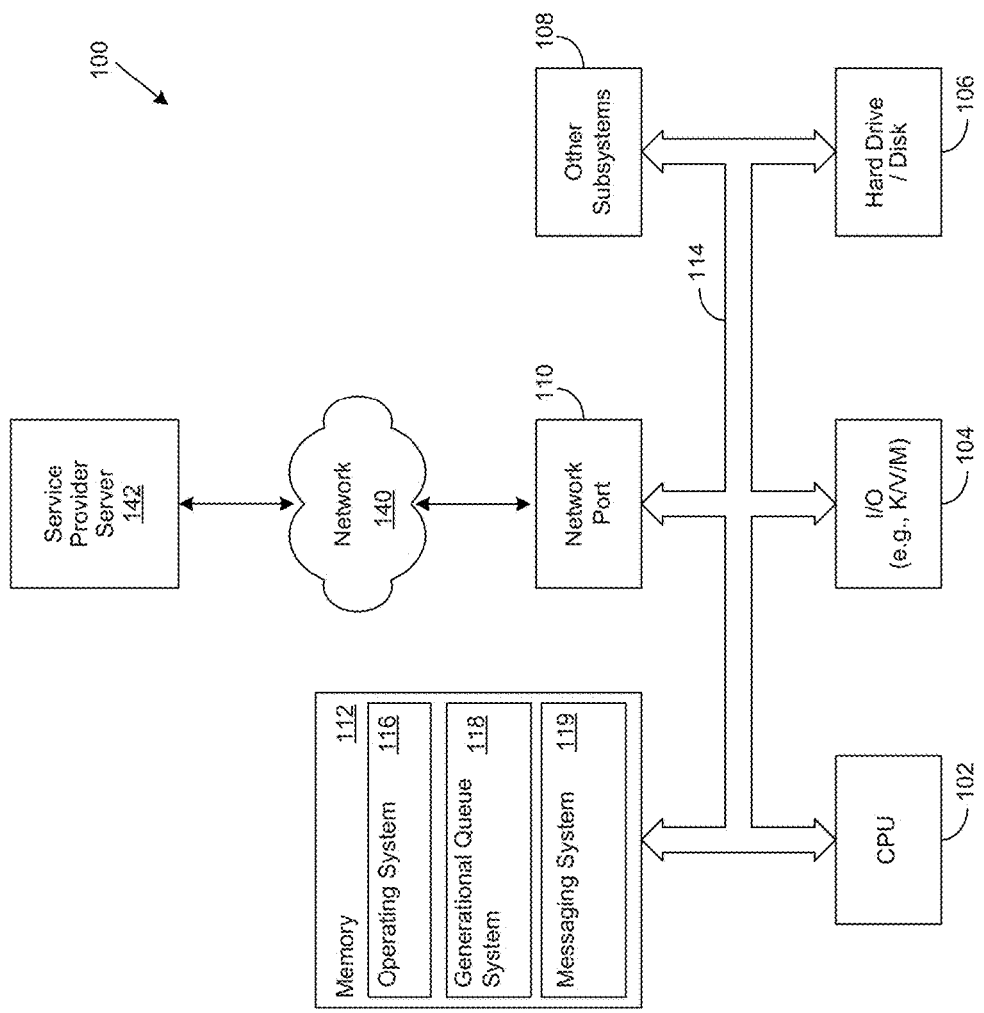
FIG. 1 shows a general illustration of components of an information handling system as implemented in the system and method of the present invention.

Various aspects of the present disclosure include an appreciation that in messaging systems with potential work item loss, a challenge can be presented when a system has to guarantee that all work items are actually processed. For example, in a scenario having N work items, with a first configuration the system might could send one work item per item to a processing module in charge of processing items or in another configuration, the system might send one work item to N different instances of a processing module. With either configuration it can be challenging to assure that processing of all work items is actually completed. In either case, if the probability of a work item being lost is a fraction Pl, then the probability that one of these N work items is lost will be N*Pl. For systems where the number of work items is large enough, there is a certainty that some work items will be lost and some items will not be processed. Various aspects of the disclosure include an appreciation that this problem can compound itself in the case where the processors themselves send work items to other modules, and these modules to even more modules. With such a scenario, the producer might not even realize that some items were not processed as there is no mechanism to notify the original producer of the work item about lost work items. Accordingly, it is desirable to provide a solution that can detect and send for reprocessing work items that have not reported successful completion while minimizing reprocessing.

A system, method, and computer-readable medium are disclosed for performing a generational queue operation. In certain embodiments, the generational queue operation centralizes detection and reprocessing of items that were not processed due to work item loss by using a work item specific data structure to track and select a next item to process.

Such a generational queue operation addresses issues that may be present when performing a guaranteed delivery pattern type operation (which may also be referred to as reactive messaging patterns with the actor model). With a guaranteed delivery pattern type operation a sender writes a work item to a persistent store before sending the work item to a recipient. The recipient is expected to return an acknowledge work item at which point the sender will remove the work item from persistent store. The sender periodically checks in the persistent store for unacknowledged work items, if the sender finds any unacknowledged work items, the sender it proceeds to resend them. With a guaranteed delivery pattern type operation, in the case where each processor sends work items to many recipients and these in turn to many others, the cost of implementing guaranteed delivery in all modules for all possible work items can be very high. Also, performance can be impacted by the nearly constant access of the persistent store.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a generational queues system 118. In various embodiments, the system memory may further comprise one or more messaging systems 119. In one embodiment, the information handling system 100 is able to download the generational queues system 118 from the service provider server 142. In another embodiment, the generational queues system 118 is provided as a service from the service provider server 142.

The generational queue system 118 performs a generational queue operation. In certain embodiments, the generational queue operation centralizes detection and reprocessing of items that were not processed due to work item loss by using a work item specific data structure to track and select a next item to process. In certain embodiments, the generational queue operation uses a generational queue. Items that need processing are added to the generational queue. In certain embodiments, in addition to the actual item, the queue maintains a time stamp and generation indication. In certain embodiments, the generation indication includes a counter which indicates a generation for the item. In certain embodiments, the generation indication indicates how many times the item has been added to the queue. As items need to be processed, the queue returns the item most eligible to be processed, taking into consideration time in the queue, position and generation. At the same time, the item is removed from the top of the queue and re added to the end with a new time stamp and an increased generation. As items are reported as processed the queue removes them.

Such a generational queue operation advantageously maintains and tracks item processing progress in a centralized location. Additionally, such a generational queue operation need not rely upon a specialized work item mechanism to ensure that each processing work item is delivered to the appropriate location. Additionally, such a generational queue operation provides an adaptive mechanism for reducing reprocessing of work items.

The generational queues operation improves processor efficiency as well as all other resources involved in processing the item such as the memory and the network (and thus the efficiency of the information handling system 100) by reducing the overhead associated with implementing guaranteed delivery in all modules for all possible work items. For the purposes of this disclosure an application module may be defined as a contained set of functionalities for an application.

As will be appreciated, once the information handling system 100 is configured to perform the generational queues operation, the information handling system 100 becomes a specialized computing device specifically configured to perform the generational queues operation and is not a general purpose computing device. Moreover, the implementation of the generational queues operation on the information handling system 100 improves the functionality of the information handling system and provides a useful and concrete result of improving resource usage while protecting against work item loss.

Figure 2:
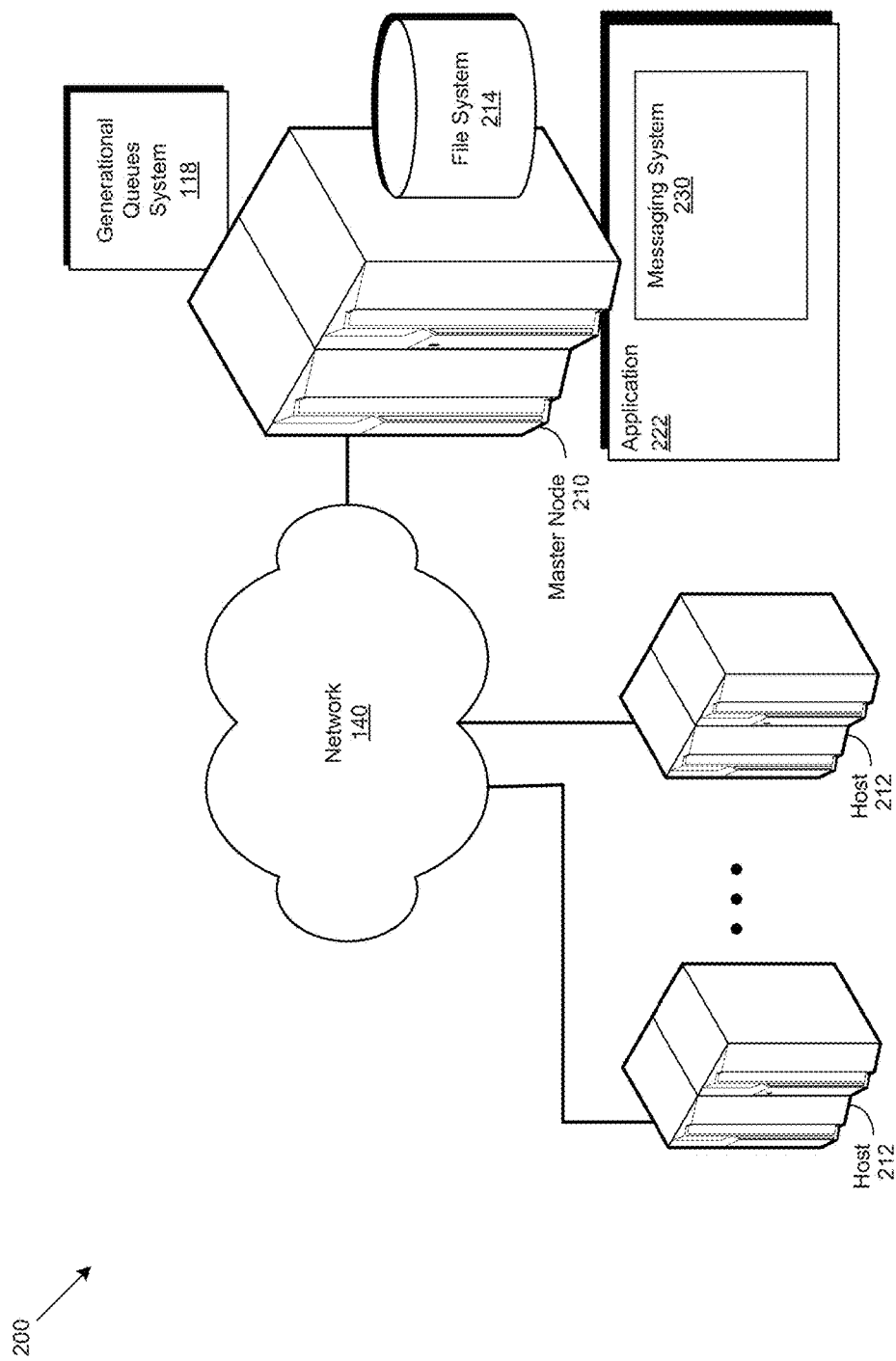
FIG. 2 shows a simplified block diagram of a generational queue environment.

FIG. 2 is a simplified block diagram of generational queues environment 200. In various embodiments, the generational queues environment 200 includes a master node system 210 and at least one host system 212. The master node 210 executes the generational queues system 118 on a hardware processor. In certain embodiments, the generational queue system 118 includes a generational queue. In certain embodiments, the generational queue is structured as a stack, where is an abstract data type that serves as a collection of elements. In certain embodiments, the generational queue includes three associated actions, a push operation, a pop operation and a kill operation. The push operation adds an element to the end of the generational queue, the pop operation returns the least recent most eligible element in the generational queue and the kill operation removes an element from the generational queue. The master node system 210 may also execute an application 222 on a hardware processor. It will be appreciated that the master node system 210 and the host system 212 may be respective information handling systems.

In various embodiments, the application 222 may comprise a messaging application 230. In these and other embodiments, a host system 212 receives messages from the messaging system 230, where a message includes one or more work items. For the purposes of this disclosure a message system 230 may be defined as a system in which interactions between modules is performed via work items rather than via method calls or invocations. In various embodiments, work items may be stored in the file system repository 214.

In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the master node 210 may be considered a producer and a host system 212 may be considered a processor. In various embodiments, a host system 212 may be considered a producer and the master node 210 or another host 212 may be considered a processor. In various embodiments, the producer processor relationship is between modules executing on the various systems. In various embodiments, the modules may be executing on other systems such as client systems. For the purposes of this disclosure, a producer may be defined as an entity which generates a message containing a work item. For the purposes of this disclosure a work item may be defined as an item to be processed. For the purposes of this disclosure a processor may be defined as an entity which executes the work item contained in a message. In various embodiments, the work item is executed by a hardware processor of the entity to perform a task corresponding to the work item.

Figure 3:
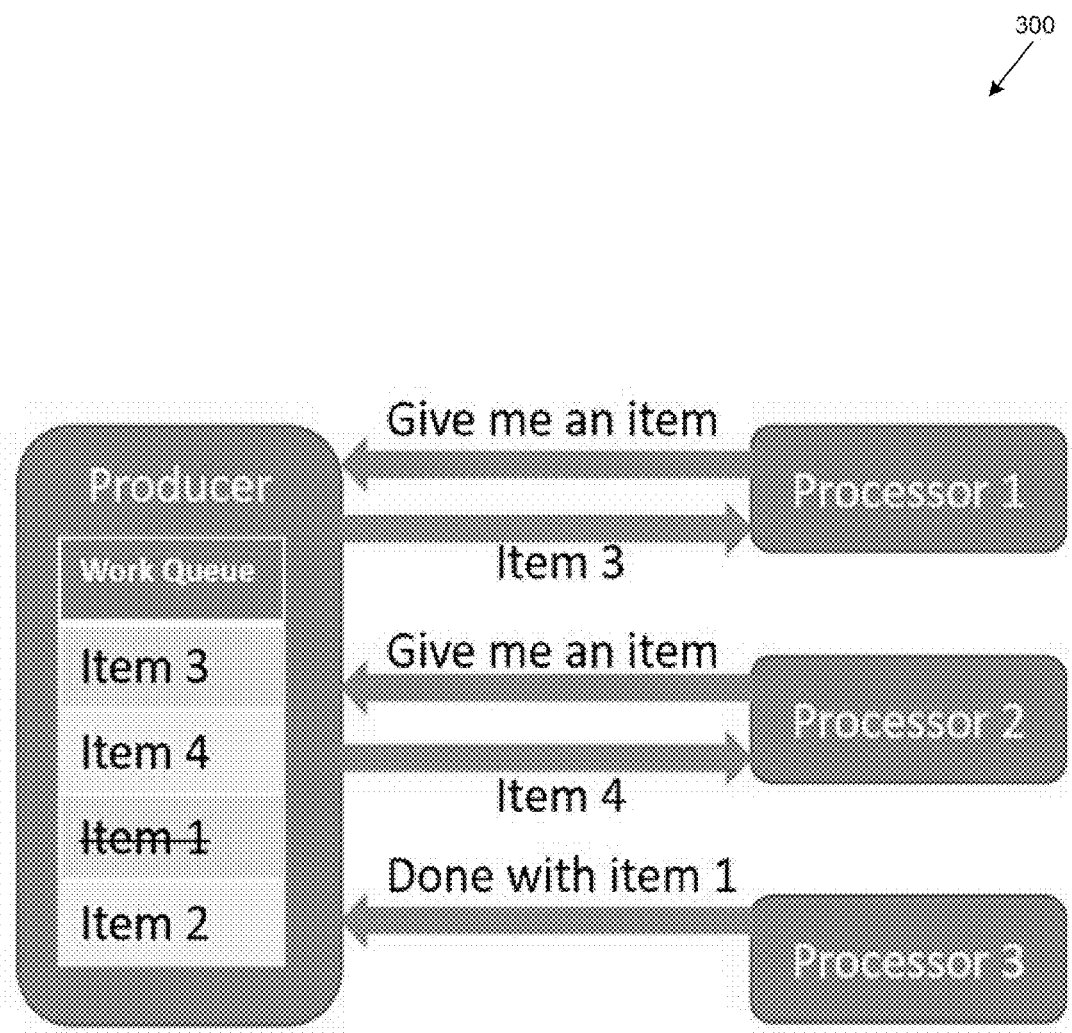
FIG. 3 shows a block diagram of producer and processor interaction.

Referring to FIG. 3, a block diagram of producer and processor interaction is shown. In various embodiments, the generational queue operation uses a special work item queue to keep track of work items. In this work item queue, an entry represents an unprocessed work item; push operations add items to the end of the work item queue; pop operations return the top most item, but then immediately push the item back in the work item queue; and, remove(id) operations remove an item with a given identifier from the queue regardless of the position of the item within the work item queue. For the purposes of this disclosure an id may be defined as a unique key that identifies a work item.

Additionally, in various embodiments, the work model used by the generational queue operation is changed so that instead of the producer sending messages to the processors, the processors generate requests to the producer for work items. Upon receiving a request, the producer executes a pop operation and returns the item that is retrieved by executing the pop operation to the processor. In various embodiments, the processors send a message to the producer when an item is processed. The producer then executes a remove operation from the work item queue.

However, under certain conditions, such a generational queue operation can result is more frequent reprocessing than is desirable. In certain scenarios, there might be more producers available than items to process, which could cause some items that were just handed to a processor to be picked up almost immediately by another processor. Accordingly, in certain embodiments, the generational queue operation includes a timestamp feature. Providing the generational queue operation with a timestamp feature provides the processor with a reasonable amount of time to work before making a determination to reprocess the item. In certain embodiments, the pop operation only returns items that have been within the work item queue for at least some fixed amount of time in the queue.

Providing the queue operation with a timestamp feature, alleviates the reprocessing issue; however, there are a couple of other potential issues with such a queue operation. Specifically, new items added to the queue may have to wait for the specified amount of time before being picked up. Additionally, items that take a long time may be reprocessed many times.

Accordingly in certain embodiments, the work item queue operation includes a generation feature, thus becoming a generational work item queue operation. With the generation feature, a generation field is included with each work item entry in the work item queue. The generation field indicates how many times an item has been picked up for processing. Additionally, with the generation feature, the Pop function is modified to pick the topmost item that has been in the queue for enough time. For the purposes of the present disclosure, enough time may be defined as a linear function. In certain embodiments, the linear function is set forth as:

Generation*time-increment.

With the generational work item queue operation, generation 0 items are picked up immediately. Generation 1 items have to wait for a little bit, generation 2 items a little bit more, etc.

The generational queues operation makes use of a feature of the generational queues environment in which reprocessing is acceptable (i.e., for reentrant scenarios). The generational queue operation is much simpler than implementing guaranteed delivery for every possible work item that derives from the item processing. Such a generational queue operation performs better since it does not have to access any persistent storage. Additionally, the majority of the logic needed to implement the generational queue operation is encapsulated within a generational queue data structure which is generic and can work for many scenarios. In certain embodiments, the generational queue data structure includes a plurality of items. In various embodiments, the plurality of items includes a list of generation items (GenItem<T>). In various embodiments, each generation item includes a key, a value of type T, a time stamp and a generation. In various embodiments, the generational queue data structure includes a plurality of functional components. In various embodiments, the plurality of functional components comprise at least one of a Push method that adds an item to the end of the generational queue, a Pop method that returns the least recent of the eligible items in the generational queue, a Remove method that removes a given item from the generational queue, a CanPop method that returns true if the generational queue has an item that is eligible for being popped, otherwise it returns false and a Has Items method that returns true if the generational queue is not empty, otherwise it returns false.

Figure 4:
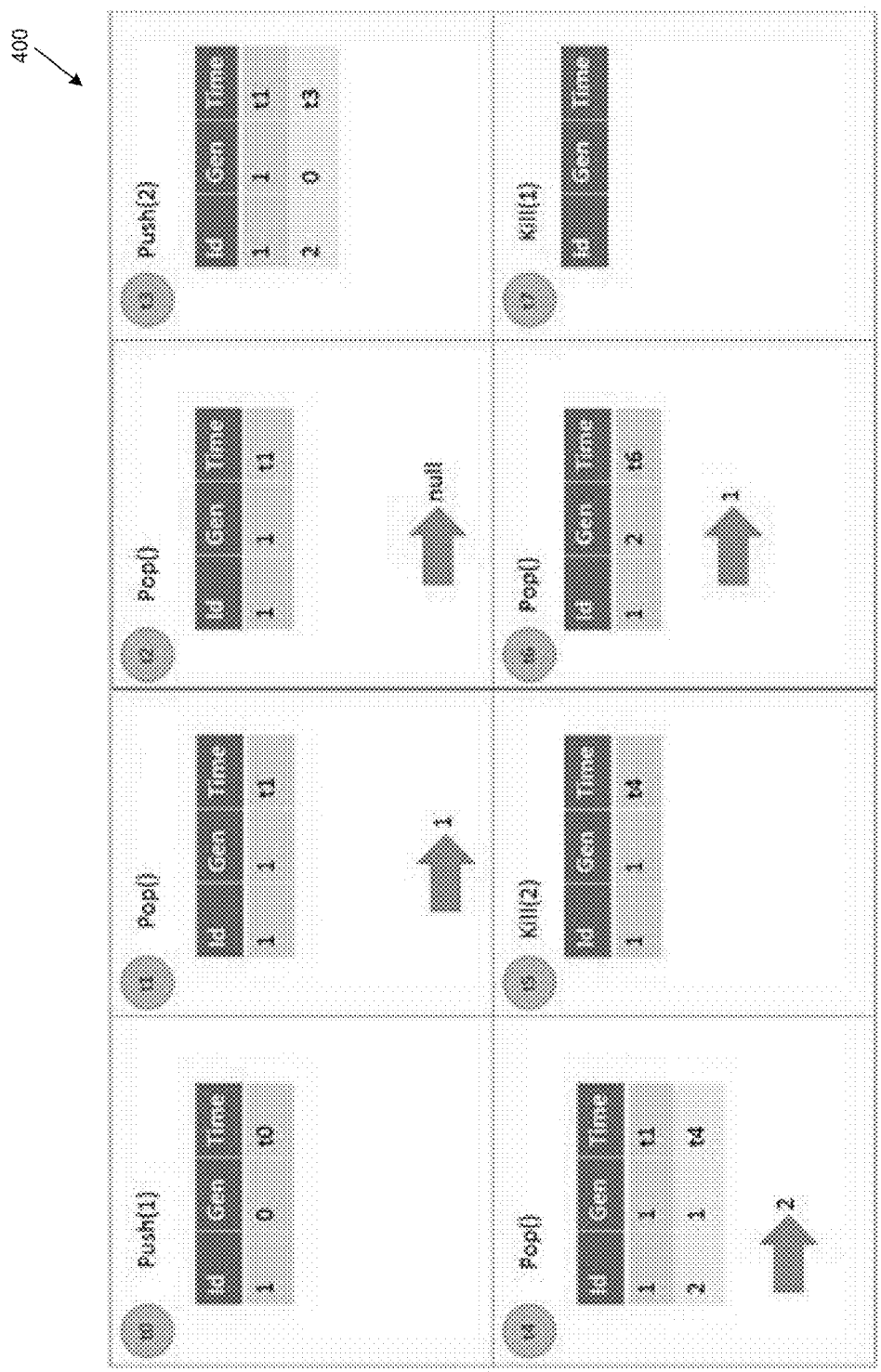
FIG. 4 shows an example of typical operations of a generational queue.

Referring to FIG. 4, an example 400 of typical operations of a generational queue is shown. More specifically, at time t0, a first queue entry (e.g., first work item) is pushed to the generational queue via a push operation. When pushing the first queue entry, the work item entry is stored in the queue. The work item entry includes work item information. In certain embodiments, the work item information includes work item identifier (id) information, generation information (Gen) and time information (Time). In certain embodiments, the time information includes a timestamp. In certain embodiments, the generation information includes an integer that indicates how many times a particular work item has been picked up for processing. The work item at time t0 is an identifier of 1, a generation indicator of 0 and a time indicator of t0. At time t1, a pop operation is performed where the first work item is popped from the generational queue, returning the identifier for the first work item. The work item information for the first work item at time t1 is an identifier of 1, a generation indicator of 1 and a time indicator of t1. At time t2, a pop operation is performed where a null value is returned. The work item information for the first work item at time t2 is an identifier of 1, a generation indicator of 1 and a time indicator of t1. The null value is returned because enough time has not passed for the first work item (i.e., the first work item waits four ticks (i.e., time increments)) before being served again. In the present example, the time increment is set to four.

Next, at time t3, a second work item is pushed to the generational queue via a push operation. The work item information for the first work item at time t3 is an identifier of 1, a generation indicator of 1 and a time indicator of t1. The work item information for the second work item at time t3 is an identifier of 2, a generation indicator of 0 and a time indicator of t3. Next at time t4, a pop operation is performed returning the identifier for the second work item. When performing the pop operation, the generational queue operation filters out items that are not old enough and then service items in or of generation and then in order to timestamp. The work item information for the first work item at time t4 is an identifier of 1, a generation indicator of 1 and a time indicator of t1. The work item information for the second work item at time t4 is an identifier of 2, a generation indicator of 1 and a time indicator of t4.

Next, at time t5, the producer receives an indication that the execution of the second work item has completed. Accordingly, a kill operation is performed where the second work item is removed from the generational queue. The work item information for the first work item at time t5 is an identifier of 1, a generation indicator of 1 and a time indicator of t4. Next, at time t6, a pop operation is performed returning the identifier for the first work item. The work item information for the first work item at time t6 is an identifier of 1, a generation indicator of 2 and a time indicator of t6. Next, at time t7, the producer receives an indication that the execution of the second work item has completed. Accordingly, a kill operation is performed where the second work item is removed from the generational queue.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a work item queuing operation, comprising:

sending a work item from a producer to a processor;
adding the work item to a generational queue upon sending the work item from the producer to the processor via a push operation; and,
resending the work item from the producer to the processor via a pop operation when the work item is not processed by the processor, the work item queuing operation centralizing detection and reprocessing of items that were not processed due to work item loss; and wherein
the work item added to the generational queue comprises a work item specific data structure, the work item specific data structure enabling tracking of the work item and selecting a next item to process from the generational queue;
the work item specific data structure comprises generation information; and,
the generation information comprises a generation indication, the generation indication providing an indication of how many times the producer has attempted to forward the work item to the processor.

2. The method of claim 1, wherein:
the work item specific data structure further comprises at least one of work item identifier information, generation information and time information.

3. The method of claim 2, wherein:
the time information comprises a time stamp representing a time when the work item is added to the generational queue.

4. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
sending a work item from a producer to a processor;
adding the work item to a generational queue upon sending the work item from the producer to the processor via a push operation; and,
resending the work item from the producer to the processor via a pop operation when the work item is not processed by the processor, the work item queuing operation centralizing detection and reprocessing of items that were not processed due to work item loss; and wherein
the work item added to the generational queue comprises a work item specific data structure, the work item specific data structure enabling tracking of the work item and selecting a next item to process from the generational queue;
the work item specific data structure comprises generation information; and,
the generation information comprises a generation indication, the generation indication providing an indication of how many times the producer has attempted to forward the work item to the processor.

5. The system of claim 4, wherein:
the work item specific data structure further comprises at least one of work item identifier information and time information.

6. The system of claim 5, wherein:
the time information comprises a time stamp representing a time when the work item is added to the generational queue.

7. A non-transitory, computer-readable storage medium embodying computer program code, the computer program code comprising computer executable instructions configured for:
sending a work item from a producer to a processor;
adding the work item to a generational queue upon sending the work item from the producer to the processor via a push operation; and,
resending the work item from the producer to the processor via a pop operation when the work item is not processed by the processor, the work item queuing operation centralizing detection and reprocessing of items that were not processed due to work item loss; and wherein
the work item added to the generational queue comprises a work item specific data structure, the work item specific data structure enabling tracking of the work item and selecting a next item to process from the generational queue;
the work item specific data structure comprises generation information; and,
the generation information comprises a generation indication, the generation indication providing an indication of how many times the producer has attempted to forward the work item to the processor.

8. The non-transitory, computer-readable storage medium of claim 7, wherein:
the work item specific data structure further comprises at least one of work item identifier information and time information.

9. The non-transitory, computer-readable storage medium of claim 8, wherein:
the time information comprises a time stamp representing a time when the work item is added to the generational queue.

* * * * *